Sept. 8, 1970        D. D. KORELL        3,527,112

LONG WEARING FRICTION DRIVE MECHANISM

Filed Nov. 5, 1968

INVENTOR.
DONALD D. KORELL

BY Donald W. Phillips

ATTORNEY

United States Patent Office 3,527,112
Patented Sept. 8, 1970

3,527,112
LONG WEARING FRICTION DRIVE MECHANISM
Donald D. Korell, Marion, Iowa, assignor to Collins Radio Company, Cedar Rapids, Iowa, a corporation of Iowa
Filed Nov. 5, 1968, Ser. No. 773,498
Int. Cl. F16h *13/02, 13/14, 15/08, 55/52*
U.S. Cl. 74—194                                    6 Claims

ABSTRACT OF THE DISCLOSURE

A three-element friction drive means in which the input element is a drum and the output element a disc, with parallel axes. A third, coupling disc-like element has its axis perpendicular to said parallel axes, and further has an axially disposed lip around the edge thereof, and a dome-shaped, rubber-like disc secured to one surface thereof. A first spring-like means forces the third disc-like element along its axis so that its lip is spring loaded against the drum. Substantially independent thereof, the resilient dome-shaped disc provides a spring-like pressure against the rim of the output disc which rides thereon.

---

This invention relates generally to friction drive means and, more particularly, to a friction drive means which can sustain substantial wearing of the friction services thereof without appreciable degradation of performance.

There are in the prior art many types of friction drives. A large portion of these drives involves two elements, which can be two discs, a disc and a drum, or two drums, one element being driven by the other through friction contact. The degree of friction between the two elements can be caused to remain substantially constant, even though wear between the contacting surfaces occurs, by means, for example, of a spring which forces one of the rotating elements against the other. Although such a structure is satisfactory for limited use, the concept implies a transverse motion of one of the shafts to maintain a constant frictional torque as the contacting surfaces between the two elements wears away. For a more extensive use such transverse shifting of one of the shafts presents difficulties in manufacture, as well as a high probability of degradation of operation.

A further limitation of two element friction drives appears in those applications requiring a large reduction or increase of angular velocity. Two element friction drives are usually deficient in these applications due to the large amount of torque generated between the elements and the consequent increase in wear and risk of slippage.

An object of the present invention is a friction drive means wherein the wearing of the contacting surfaces will not degrade the performance of the driving means.

A second object of the invention is a three element driving means with the input and output rotating elements having their axes of rotation in planes which are only approximately perpendicular to the axis of rotation of the coupling element, and wherein the frictional contact between the input and output elements with the coupling rotation element is attained by two, independent spring-like means.

A third purpose of the invention is a three element friction drive means in which the center element has its axis of rotation substantially perpendicular to that of the input and output rotating elements and in which different portions of said center element are pre-tensed by separate spring-like means along the general direction of its axis to independently maintain a relatively constant frictional torque with the input and output rotating elements.

A fourth purpose of the invention is the improvement of friction drive means generally.

In accordance with the invention, there is provided an input rotating drum means and an output rotating disc means whose axes of rotation lie substantially on parallel planes and a third disc-like rotating means with an axially disposed lip thereon. A first spring means forces the lip of said disc-like means to make friction contact with said drum so that as the drum rotates the third disc-like means also rotates.

The output rotating disc means is positioned such that its perimeter rides in the bed of the third disc-like means. Said bed is provided with a resilient cushion, such as, for example, a dome-shaped rubber disc of high wear-resistant properties. As said third disc rotates, the output disc riding upon its bed will also be caused to rotate, thus completing the transfer of angular rotation from the input drum to the output disc.

In accordance with the feature of the invention, the spring means, which forces the coupling disc in a direction along its axis, and therefore the lip thereof against the input drum, is substantially independent of the spring-like action of the resilient, dome-shaped disc provided in the bed of said coupling disc. Since the two spring-like actions are substantially independent of each other and both axially disposed along the center coupling disc, they will automatically compensate for any wear occurring on the contacting surfaces between the three driving elements, without producing transverse strain on any of the element shafts.

The above mentioned and other objects and features of the invention will be fully understood from the following detailed description thereof when read in conjunction with the drawings in which.

Figure 1:
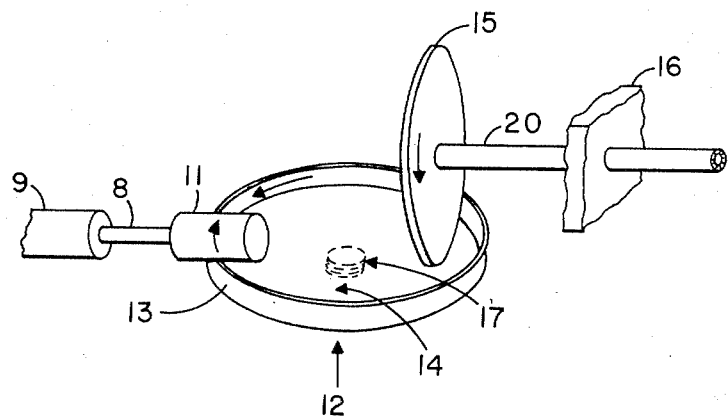
FIG. 1 shows a perspective view of the invention.

Referring now to FIG. 1, there is provided an input shaft 8 which may be secured at one end to a normally operable knob 9 and at the other end to a driving drum 11. The drum 11 should be of a resilient material having elastic properties and highly resistant to abrasive wear.

A compression spring means 17 forces the idler disc 12 in an upward direction axially along its shaft 23 so that the rim thereof makes a good friction contact with the input drum 11. The shaft 23 of idler disc 12 rotates in suitable bearing means (not shown) in frame 21.

To provide an independent means for maintaing a substantially constant force between the idler wheel 12 and the output disc 15, the bed of the idler wheel 12 has attached thereto a dome-shaped disc 14 of a resilient material, such as a silicone rubber for example. Such disc 14 is caused to be pressed firmly against the perimeter of disc 15, and as the idler disc 12 rotates, will cause the output disc 15 to rotate because of the frictional torque therebetween. The disc 15 is held in position by means of shaft 20 which is in turn secured in frame 16 by suitable bearing means, not shown. It is apparent that substantial wearing of the perimeter of disc 15 can occur before the friction drive between the bed of idler wheel 12 and disc 15 becomes seriously impaired. The dome-shaped disc 14 can be either a flat disc whose diameter is larger than that of said bed and thus is forced to shape itself into an inverted cup, or it can be a pad which is flat on the bottom side and convex on the top, exposed side.

From the foregoing it can be seen that spring 17, which forces rim 13 of idler wheel 12 against drum 11, constitutes an entirely independent pressure means from that existing between the resilient disc 14 and output disc 15. Wear between drum 11 and lip 13 will have only a minimal effect on the friction drive between idler wheel 12 and output disc 15. Similarly, wear between output disc 15 and the bed of idler wheel 12 will have little effect on the friction drive between input drum 11 and rim 13.

Figure 2:
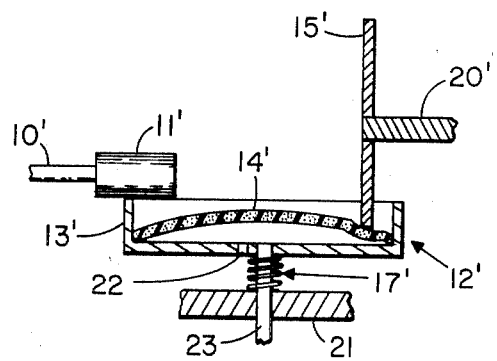
FIG. 2 shows a side view of the structure of FIG. 1.

Referring now to FIG. 2, there is shown a side view of the structure of FIG. 1. Each of the elements of FIG. 2 which has a corresponding element in FIG. 1 is identified by the same reference character, although primed.

In FIG. 2 there is shown an aperture 22 in idler wheel 12 and underneath the dome-like pad 14'. Such aperture is provided to permit the air volume under the dome 14' to change as the disc 15 rides thereover and to insure a more nearly constant frictional torque between disc 15' and dome 14'.

While the axes of rotation of drum 11 and disc 15 are shown in the figures as being substantially perpendicular to the axis of rotation of disc 12, it is to be understood that such axes (of drum 11 and disc 15) can lie anywhere within a range of 45° on either side of a plane perpendicular to the axis of disc 12. Furthermore, the angle formed by the projection of the axes of drum 11 and disc 15 upon the plane of disc 12 can be any angle between 0° and 360°.

What is claimed is:

1. Friction drive means comprising:
 first rotatable disc-like means comprising:
  first axis means;
  a circular lip formed around said axis and extending substantially parallel to said first axis means;
  spring-like means positioned to force said disc-like means along its axis in the direction of the extension of said circular lip;
  resilient disc means secured on one major surface of said first disc-like means;
 drum-like means having a second axis at an angle less than 45° with respect to a plane substantially perpendicular to said first axis means and positioned to have said lip press against the periphery thereof under the influence of said spring-like means; and
 second rotatable disc-like means having a third axis at an angle less than 45° with respect to a plane substantially perpendicular to said first axis and having its perimeter riding on said resilient disc means; said resilient disc means comprising a flat disc having a diameter slightly larger than that portion of said first disc-like means lying within said circular lip, to thereby assume an inverted cup-like shape, with said second disc-like means riding upon the convex surface thereof.

2. Friction drive means in accordance with claim 1 in which said drum-like means is comprised of a resilient material having a coefficient of friction with said contacting lip sufficiently high to prevent slippage therebetween in the normal operating range thereof.

3. Friction drive means in accordance with claim 1 in which said first disc-like means has an aperture formed therethrough to provide for passage of air to and from the space between said resilient disc and said first disc-like means.

4. Friction drive means comprising:
 first rotatable disc-like means comprising:
  first axis means;
  a circular lip formed around said axis and extending substantially parallel to said first axis means;
  spring-like means positioned to force said first disc-like means along its axis in the direction of the extension of said circular lip;
  resilient disc means secured on one major surface of said first disc-like means;
 drum-like means having a second axis at an angle less than 45° with respect to a plane substantially perpendicular to said first axis means and positioned to have said lip press against the periphery thereof under the influence of said spring-like means; and
 second rotatable disc-like means having a third axis at an angle less than 45° with respect to a plane substantially perpendicular to said first axis and having its perimeter riding on said resilient disc means;
 said resilient disc means comprising a flat disc having a diameter slightly larger than that portion of said first disc-like means lying within said cirular lip, and having one surface thereof convex in shape, with said second disc-like means riding upon said convex surface.

5. Friction drive means in accordance with claim 4 in which said drum-like means is comprised of a resilient material having a co-efficient of friction with said contacting lip sufficiently high to prevent slippage therebetween in the normal operating range thereof.

6. Friction drive means in accordance with claim 4 in which said first disc-like means has an aperture formed therethrough to provide for passage of air to and from the space between said resilient disc and said first disc-like means.

References Cited

UNITED STATES PATENTS

| | | | |
|---|---|---|---|
| 1,145,439 | 7/1915 | Rose | 74—194 |
| 2,850,912 | 9/1958 | Goldmark | 74—206 |
| 3,122,929 | 3/1964 | Petry | 74—209 XR |
| 3,168,773 | 2/1965 | Frye | 74—215 XR |

JAMES A. WONG, Primary Examiner

U.S. Cl. X.R.

74—206, 209, 215

UNITED STATES PATENT OFFICE
CERTIFICATE OF CORRECTION

Patent No. 3,527,112                          September 8, 1970

Donald D. Korell

It is certified that error appears in the above identified patent and that said Letters Patent are hereby corrected as shown below:

Column 3, cancel lines 34-39. Column 4, lines 29 -31 should be canceled and -- said resilient disc means comprising a disc having a diameter not greater than the diameter of that portion of said first disc-like means lying within said circular lip, -- substituted therefor.

Signed and sealed this 16th day of March 1971.

(SEAL)
Attest:

Edward M. Fletcher, Jr.                       WILLIAM E. SCHUYLER, JR.
Attesting Officer                               Commissioner of Patents